US010457217B1

(12) United States Patent
Lingerfelt

(10) Patent No.: US 10,457,217 B1
(45) Date of Patent: Oct. 29, 2019

(54) EASY STEP

(71) Applicant: Lee Roy Lingerfelt, Lenoir, NC (US)

(72) Inventor: Lee Roy Lingerfelt, Lenoir, NC (US)

( * ) Notice: Subject to any disclaimer, the term of this patent is extended or adjusted under 35 U.S.C. 154(b) by 0 days.

(21) Appl. No.: 16/293,971

(22) Filed: Mar. 6, 2019

(51) Int. Cl.
| | |
|---|---|
| *B60R 3/00* | (2006.01) |
| *B60R 3/02* | (2006.01) |
| *E05B 85/00* | (2014.01) |
| *B60Q 9/00* | (2006.01) |
| *B60R 9/02* | (2006.01) |

(52) U.S. Cl.
CPC ............ *B60R 3/00* (2013.01); *B60Q 9/00* (2013.01); *B60R 9/02* (2013.01); *E05B 85/00* (2013.01)

(58) Field of Classification Search
CPC ........... B60R 3/00; B60R 3/002; B60R 3/007; B60R 3/02; B60Y 2200/14
See application file for complete search history.

(56) References Cited

U.S. PATENT DOCUMENTS

| | | | | |
|---|---|---|---|---|
| 8,967,650 B1 * | 3/2015 | Majors | ...................... | B60R 3/00 |
| | | | | 280/163 |
| 9,156,405 B1 * | 10/2015 | Levesque | .................. | B60R 3/00 |
| 2007/0108718 A1 * | 5/2007 | Ruehl | ....................... | B60R 3/00 |
| | | | | 280/163 |

* cited by examiner

*Primary Examiner* — Bryan A Evans
(74) *Attorney, Agent, or Firm* — Monty Simmons; Simmons Patents

(57) ABSTRACT

Disclosed is a universal easy step apparatus configured for being quickly associated and removed from an existing step system such as the steps of a semi-trailer truck for a plurality of truck brands defining different step system configurations without the need for hardware modification to either the easy step or the truck. The easy step may further define a secure compartment for storing items. An electronic module may be disposed inside the electronic module to monitor various environment parameters and the truck driver and allow remote wireless access to the secure compartment.

16 Claims, 7 Drawing Sheets

EASY STEP

CLAIM TO PRIORITY

NONE

TECHNICAL FIELD

An apparatus for assisting entry into elevated vehicles compartments.

BACKGROUND OF THE INVENTION

There are many vehicles that have elevated compartments that a user needs to access and enter. One example is the trucks used to transport freight. According to the American Trucking Associations (ATA), the dominant mode of freight transportation in the U.S. continues to be trucking, which moves over 70 percent of freight tonnage annually. The $726.4 billion in gross freight revenues from trucking in 2015 represented 81.5 percent of the nation's freight bill. In terms of tonnage, 10.49 billion tons of freight were transported, representing 70.1 percent of total domestic tonnage shipped that same year. Indeed, it has been estimated that there were a total of 329 million trucks, buses, and miscellaneous commercial vehicles registered worldwide in 2014.

One significant problem with prior art large trucks is that their cab compartments are elevated well about ground level and there are typically only two entry steps (about 20 inches apart) for a person to use to climb into such large trucks. Notably, for humans, the typical height of a step (distance between horizontal surfaces) is about half that or 10 inches. While a 20-inch step may not pose much of a problem for the young truck driver, time is the fire in which we all burn, and young truck drivers become older truck drivers, and a 20-inch step becomes a problem.

The U.S. Pat. No. 9,156,405, issued to Levesque on 13 Oct. 2015, discloses a supplemental step assembly for a vehicle and method of use. The current Applicant has been a truck driver for over 20 years and had experimented with a similar version of the Levesque step for at least 15 years. While such a supplemental step was better than no supplemental step, it had its limitations. The Levesque supplemental step and Applicant's supplemental step (previous versions) installation process is too complex. The Applicant often changed trucks and when he did, he took his prior art experimental step with him. But Like the Lévesque supplemental step, the removal and reinstallation process required much more time and effort than Applicant thought was necessary. Further, the brand of semi-trucks Applicant drove often changed (Freightliner®, International®, Volvo®, Kenworth®, Peterbilt® to name a few). Such semi-trucks had their own step configurations with different step designs and thicknesses. Some had open access to the bottom of the step, and some did not. Such meant that neither the Levesque supplement step nor the Applicant's prior step design would work for all trucks without modifying the truck (for some trucks). Generally, such required drilling a hole to the bottom plate covering the truck's step.

What is needed is integral one-piece step with fixed dimensions comprising an attachment interface that is configured to be easily associated and removed with an existing vehicle step for a plurality of vehicles having a plurality of designs without the need to modify the vehicle step or vehicle step assembly.

SUMMARY OF THE INVENTION

Some of the objects and advantages of the invention will now be set forth in the following description, while other objects and advantages of the invention may be obvious from the description or may be learned through practice of the invention.

Broadly speaking, a principal object of the present invention is to provide an easy step structure configured for being associated with an existing step system.

Another object of the invention is to provide a universal easy step system configured for being associated an existing step system without hardware modification to the easy step apparatus or the step system and that can be associated with the surface of a plurality of step systems defining a plurality of interfaces.

Yet another object of the invention is to provide a universal easy step system configured for being associated an existing step system without hardware modification and that can be associated with the surface of a plurality of step systems defining a plurality of interfaces where the easy step further comprises a secure compartment.

Yet another object of the invention is to provide a universal easy step system and secure compartment comprising an electronic module define one or more functions such as remote lock and unlock, lighting, DVR, recording and information functions.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
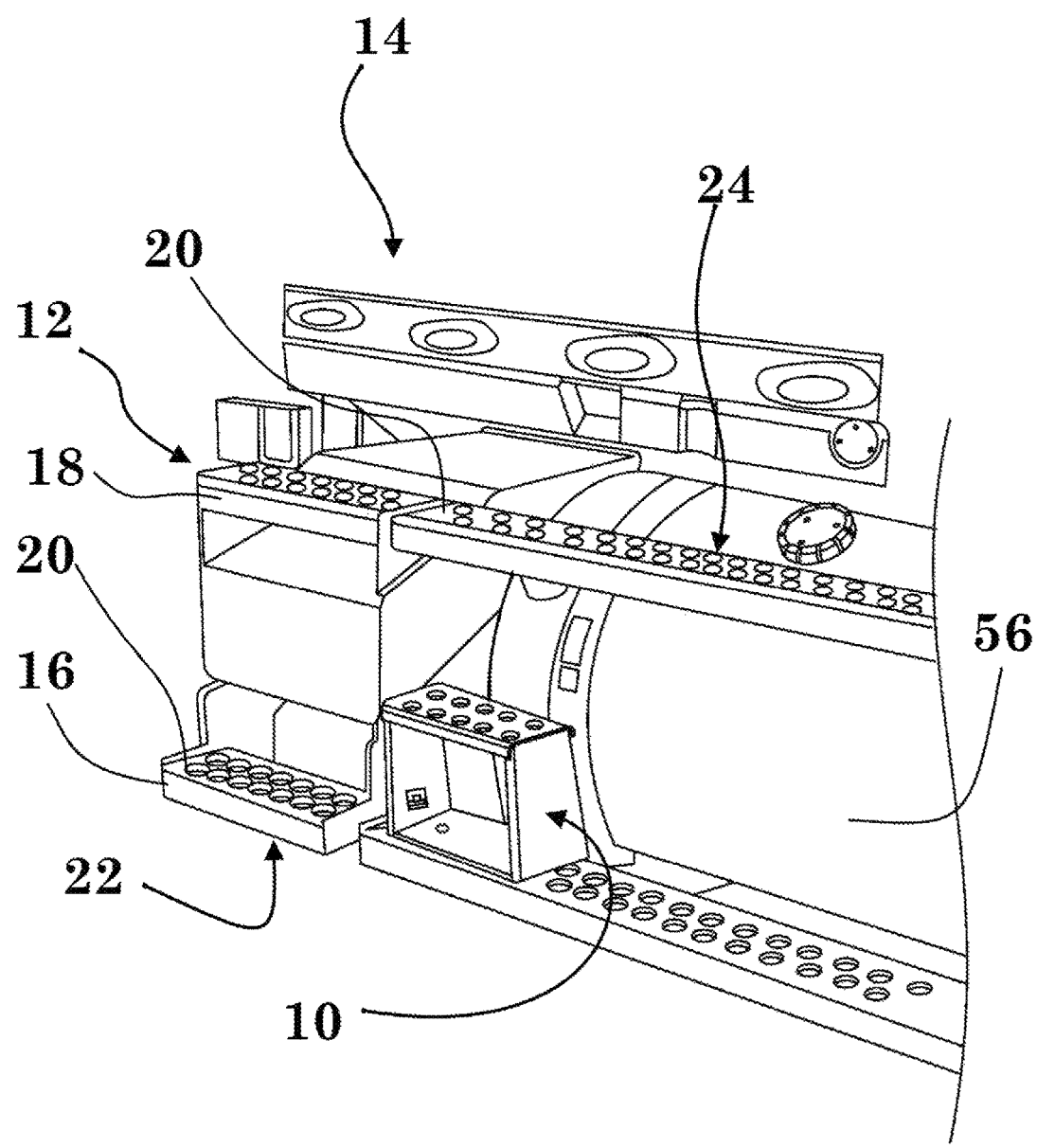
FIG. 1 is a perspective view of a universal easy step associated with a step-element of a step system.

Repeated use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

Construction Aids

For the purposes of this document two or more items are "mechanically associated" by bringing them together or into relationship with each other in any number of ways including a direct or indirect physical "releasable connections" (snaps, screws, Velcro®, bolts, clamps, etc.—generally connections designed to be easily and frequently released and reconnected), "hard-connections" (welds, rivets, macular bonds, generally connections that one does not anticipate disconnecting very often if at all—a connection that is "broken" to separate), and/or "moveable connections" (rotating, pivoting, oscillating, adjustable, sliding etc.).

Similarly, two or more items are "electrically associated" by bringing them together or into relationship with each other in any number of ways including: (a) a direct, indirect or inductive communication connection, and (b) a direct/ indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

For the purposes of this document, unless otherwise stated, the phrase "at least one of A, B, and C" means there is at least one of A, or at least one of B, or at least one of C or any combination thereof (not one of A, and one of B, and one of C). As used herein, the terms "first," "second," and "third" may be used interchangeably to distinguish one component from another and are not intended to signify location or importance of the individual components. The term "about" means plus or minus 10% unless stated otherwise.

This document includes headers that are used for place markers only. Such headers are not meant to affect the construction of this document, do not in any way relate to the meaning of this document nor should such headers be used for such purposes.

While the particulars of the present invention and associated technology may be described for use with step systems for large trucks such as semi-trailer truck, the disclosed technology may be used for any type of step system.

Written Description

Referring now to FIG. 1, one exemplary embodiment of a universal easy step 10 is presented associated with a step system 12 of a large truck 14. The exemplary step system 12 comprises a first step-element 16 and a second step-element 18 elevated about 20-inches above and parallel to the first step-element 16. Each step-element defines a top step-surface 20 and opposing bottom step-surface 22 defining a plurality of step-surface-voids 24 (e.g. holes) therethrough. Notably, each step system manufacturer generally provides the above step-elements but with unique features such as unique void/hole patterns and step-element thicknesses. Thus, the hole/void pattern of a Peterbilt® truck, for example, will likely be different from the void pattern of a Freightliner® which is likely different from an International® and so on. Further, the distance between the top step-surface 20 and the opposing bottom step-surface 22 (thickness) will likely be different between truck brands. The universal easy step 10 is preferably configured for being quickly mechanically associated with (and removed from) a surface 20 of any one of a plurality of step systems 12 each defining unique features without the need for hardware modifications to either the easy step 10 or the truck 14.

Figure 3:
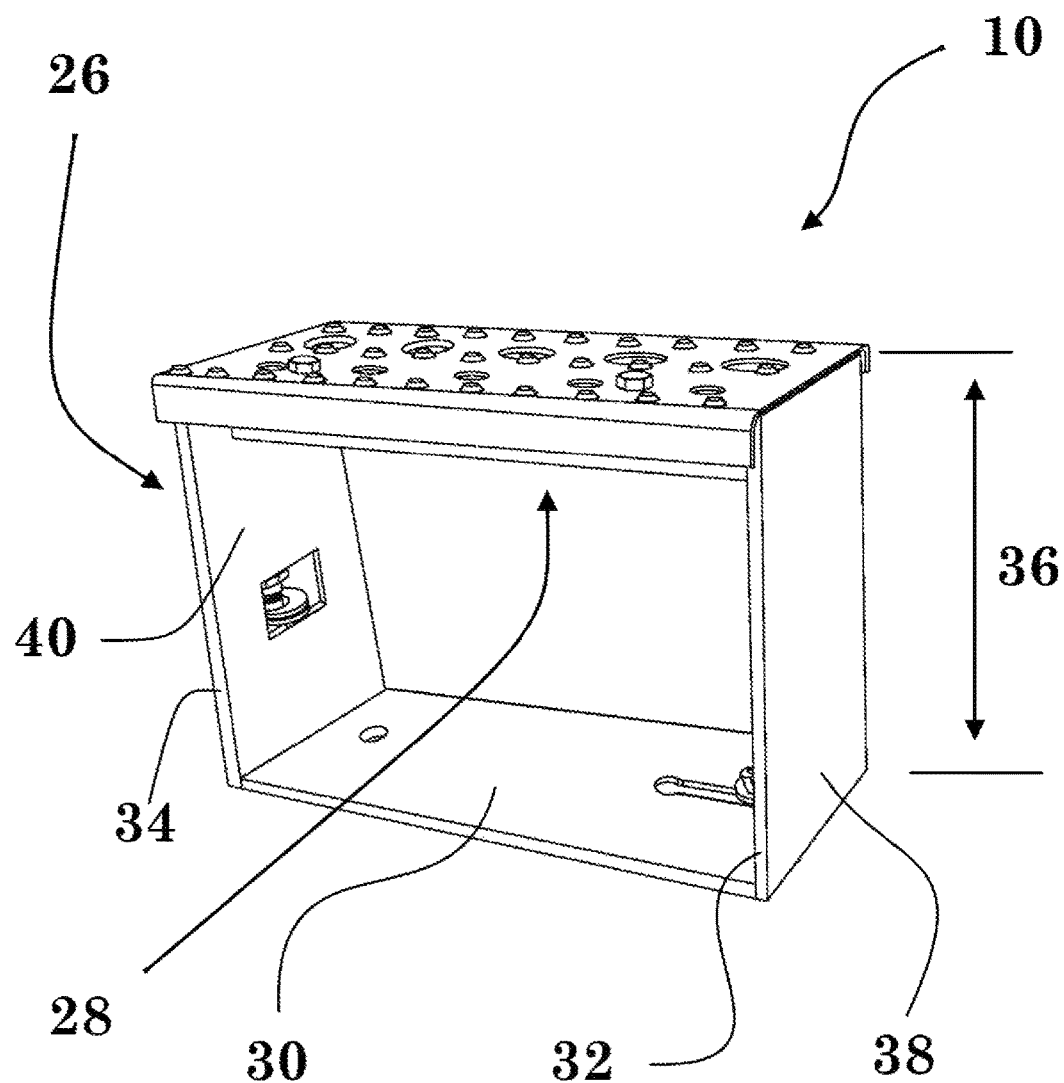
FIG. 3 is a front perspective view of an exemplary easy step.
Figure 4:
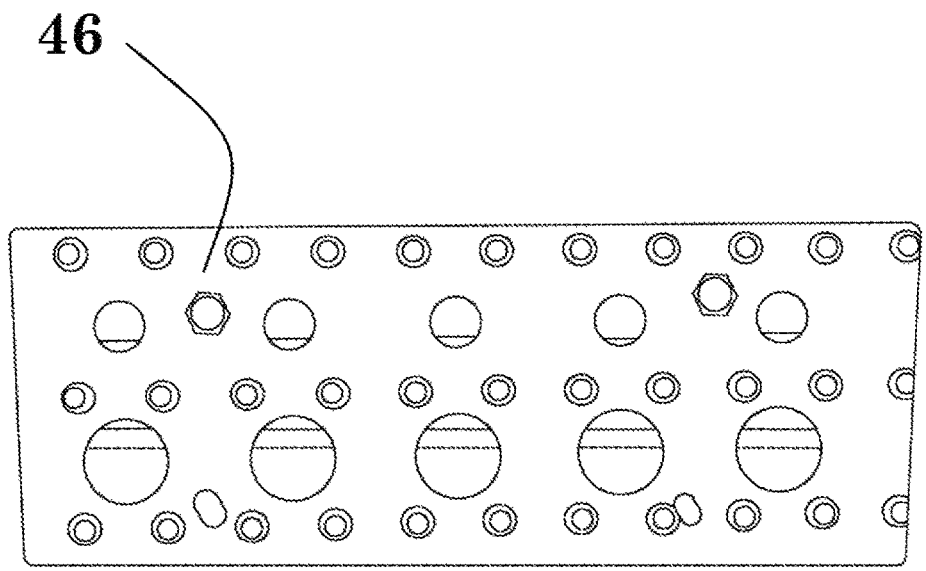
FIG. 4 is a top plan view of an exemplary easy step.
Figure 5:
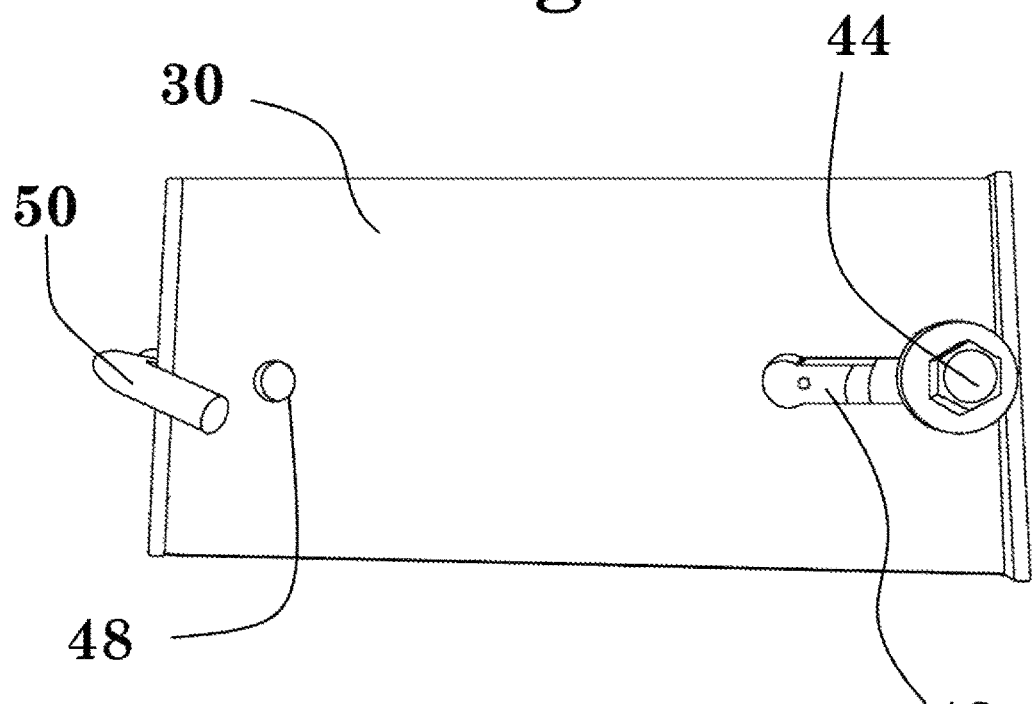
FIG. 5 is a bottom plan view of an exemplary easy step.
Figure 6:
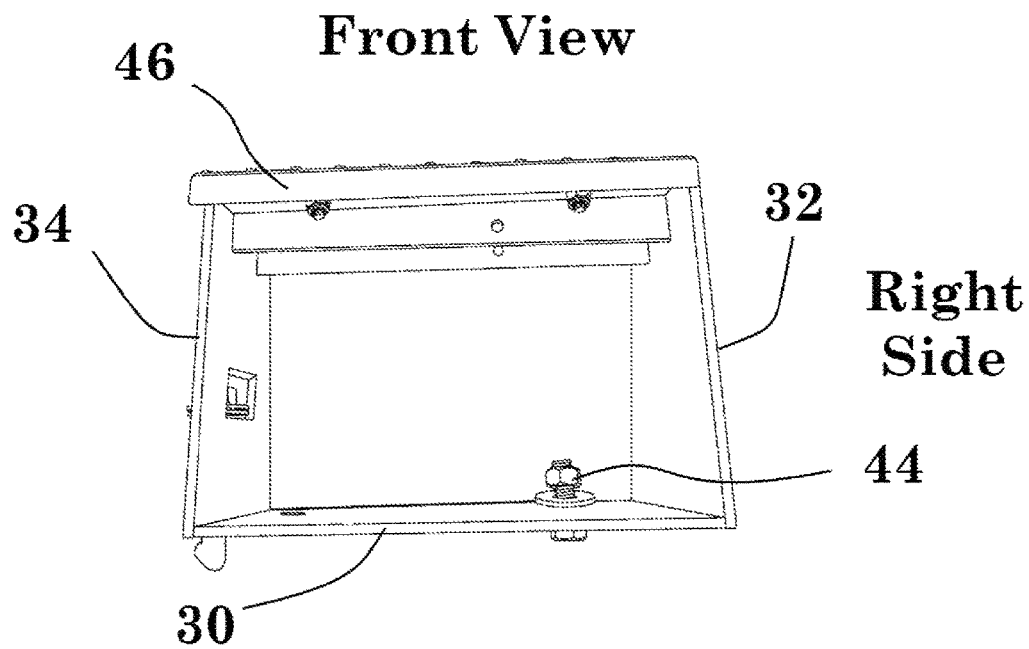
FIG. 6 is a front elevational view of an exemplary easy step.

Referring now more particularly to FIG. 3 through FIG. 9, a universal easy step 10 is considered in more detail. The universal easy step 10 comprises an integral frame 26 defining an open box structure. The "open box" structure provides a toe space should a user desire to place his/her foot into the "open box". The term "integral" simply means the box frame is formed as one component or becomes one component after assembly and is not intended to be easily separated (i.e. a "hard-connection") into separate components during use. For example, the frame 26 may be molded from a plastic or composite material to define a one-piece structure or it may be formed by welding metal plates together to form one integral piece. The frame 26 comprises a top frame element 28 mechanically associated with a bottom frame element 30 by a right frame side element 32 and a left frame side element 34 thereby defining a frame height 36 therebetween. Ideally, the frame height 36 would be about half the distance between adjacent step-elements (16, 18). When the distance between step-elements is about 20-inches, the frame height is between about 7 to 10 inches. As depicted in FIG. 3, the frame side elements each define an outer surface 38 and an inner surface 40 (relative to the open box structure). The bottom frame element 28 preferably defines an attachment element interface 42 configured to adjustably receive an attachment element 44 (FIG. 4). For the current embodiment, such attachment element interface 42 is a slot. A series of holes could also be used. Notably, the frame 26 optionally defines a supplemental attachment element void 48 defined through the bottom frame element 30 configured to receive a second attachment element. It should be appreciated that a series of attachment element voids 48 may be defined through bottom frame element 30 to allow for different hole patterns.

Embodiments of the top frame element 28 and the bottom frame element 30 include plates and rails. For the preferred embodiments depicted in the figures, the bottom frame element 30 is a plate. One of the issues with prior art designs (like the one Applicant originally created) was the lack of a bottom frame element requiring four times the bolts as the current design. Such makes moving the apparatus from one truck to another a much bigger nuisance (more work and time) than necessary. Surprisingly, by using a bottom frame element 30 as disclosed herein, only one attachment element is required to secure the universal easy step to a step-element making installation and removal significantly easier and faster than prior art designs. That said, the disclosed technology teaches the use of a second attachment element and additional attachment element interfaces should extra protection be desired.

The easy step 10 may further comprise an anti-slip outer surface defined by the top frame element 28 or an easy step interface 46 mechanically associated with the top frame element 28 (the version depicted in the figures). Any type of anti-slip technology may be used including raised ridges, rubber and other anti-slip material known in the art. Anti-slip simply means to resist slipping.

Figure 8:
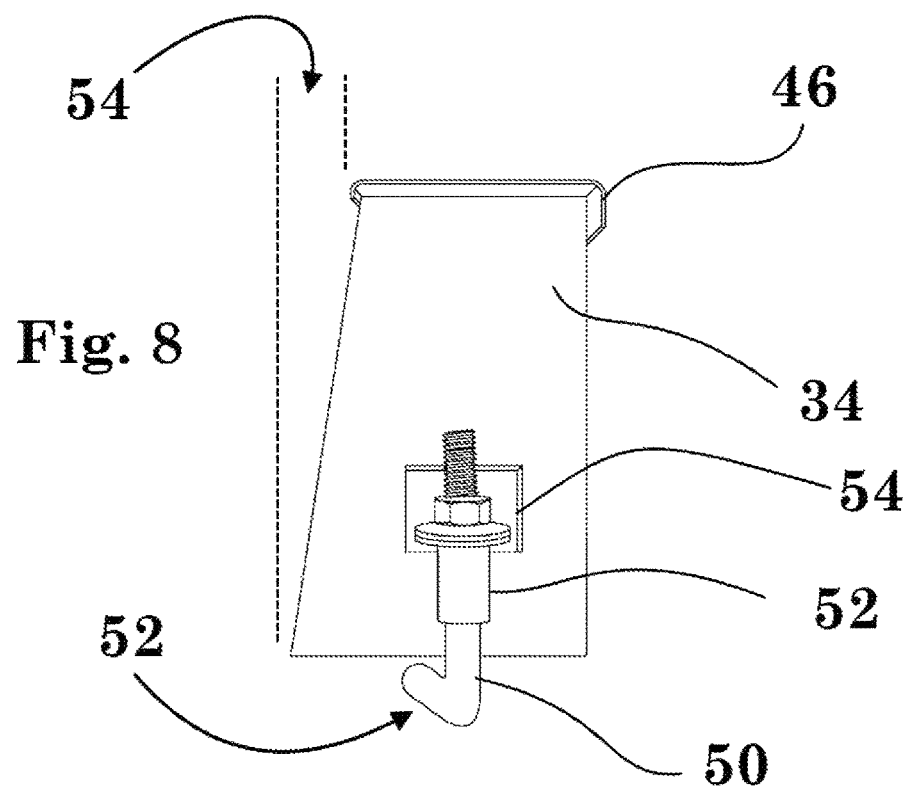
FIG. 8 is a Left Side elevational view of one exemplary embodiment of an easy step.
Figure 9:
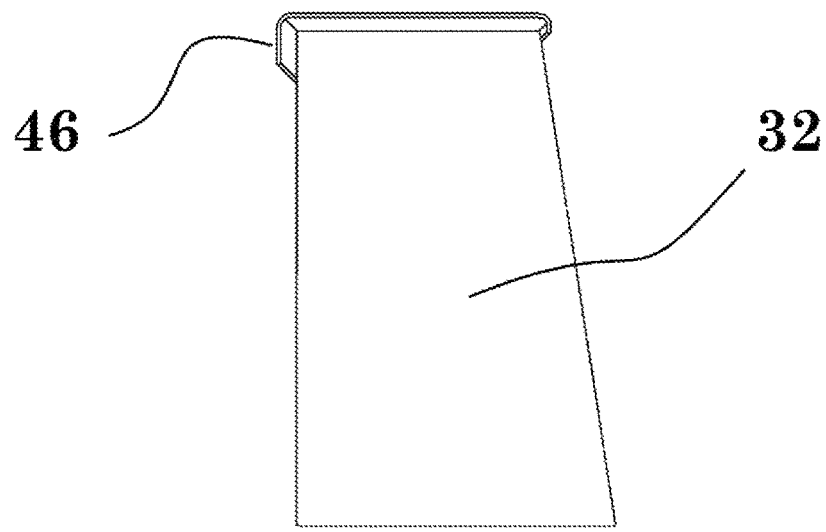
FIG. 9 is a Right Side elevational view of one exemplary embodiment of an easy step.

Notably, as best seen FIG. 8, for one embodiment, the bottom frame element 30 is wider than the top frame element 28 creating a step-offset 54. Ideally, as depicted in FIG. 1, the step-offset 54 allows the easy step 10 to slant away from and clear the tank 56 (or other objects) defined by the large truck 14.

As noted before, by using the disclosed design comprising a bottom frame element 30, only one attachment element 44 is needed to secure the universal easy step 10 to the first step-element 16. This feature along significantly decreases the labor and time needed to secure and remove the universal easy step 10 from the step system 12 making it significantly more feasible for a drive to move the universal easy step 10 from one truck to another even where the various trucks have unique step system features. As depicted in the various figures, for one embodiment, the attachment element 44 defines a simple bolt. One of ordinary skill in the art will appreciate, however, that one will not always have access to the opposing bottom step-surface 22 of step system 12 as some trucks cover this surface with a plate. Such also means one will not have access to the bottom side of the attachment element 44 preventing the use of tools (such as sockets and wrenches) to install the easy step 10. Consequently, while the figures show a simple bolt, attachment element 44 preferably defines a hook feature similar to the hook feature defined by supplemental attachment element 50 (described later and as best seen in FIG. 8). The attachment element 44 with a hook feature 50 is configured to extend through the attachment element interface 42 and one of the plurality of step-surface-voids 24 defined by the first step-element 16 (for any one of the plurality of step systems defined by the various manufacturers as described above) and secure the bottom frame element 30 to the step-element without hardware modifications to either the easy step 10 or the step-element. Such a feature provides at least two significant benefits: (a) it makes the task of associating the easy step 10 with a step system 12 (without access to the opposing bottom step-surface) significantly faster and easier and (b) no hardware modifications are needed to either the easy step 10 or the associated step system 12 or large truck 14.

Figure 7:
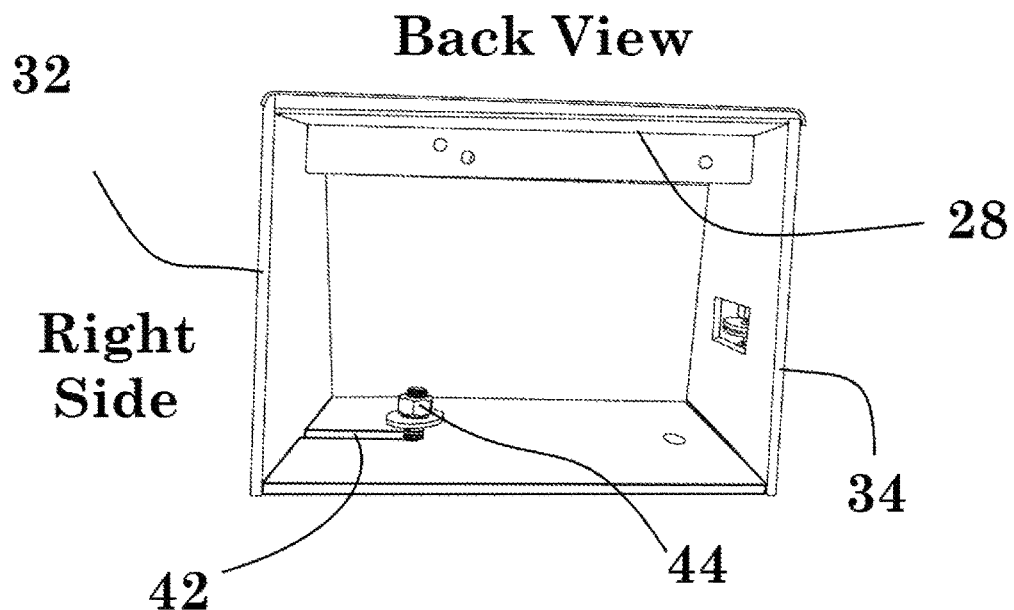
FIG. 7 is a back elevational view of an exemplary easy step.

As best seen in FIG. 8, a supplemental attachment element receiver 52 is associated with the outer surface 34 of the left frame side element 34 and is configured to receive a supplemental attachment element 50. Such option provides a more secure association between the easy step 10 and the step system 12 for those with higher safety requirements. For the preferred embodiment, the supplemental attachment element receiver 52 defines a conduit having an inner perimeter consistent with the outer perimeter of the supplemental attachment element 50. If the supplemental attachment element is a bolt with a square outer perimeter, the supplemental attachment element receiver 52 defines a similar square inner perimeter slightly larger than the supplemental attachment element 50 outer perimeter. The access void 54 allows space for a tool used to adjust, tighten and loosen the supplemental attachment element 50. One of ordinary skill in the art will further appreciate that such a configuration allows compensating for variation step system thickness as described above. Thus, as depicted in FIG. 3 and FIG. 7, for this exemplary embodiment, the attachment element interface 42 is disposed between the side elements 32, 34 and on the right side of said bottom frame element 30 (note FIG. 7 is the back side so left and right are reversed) and the second "supplemental" attachment element 50 is associated with side outer surface of the left frame side element 34.

Secure Compartment

Figure 2:
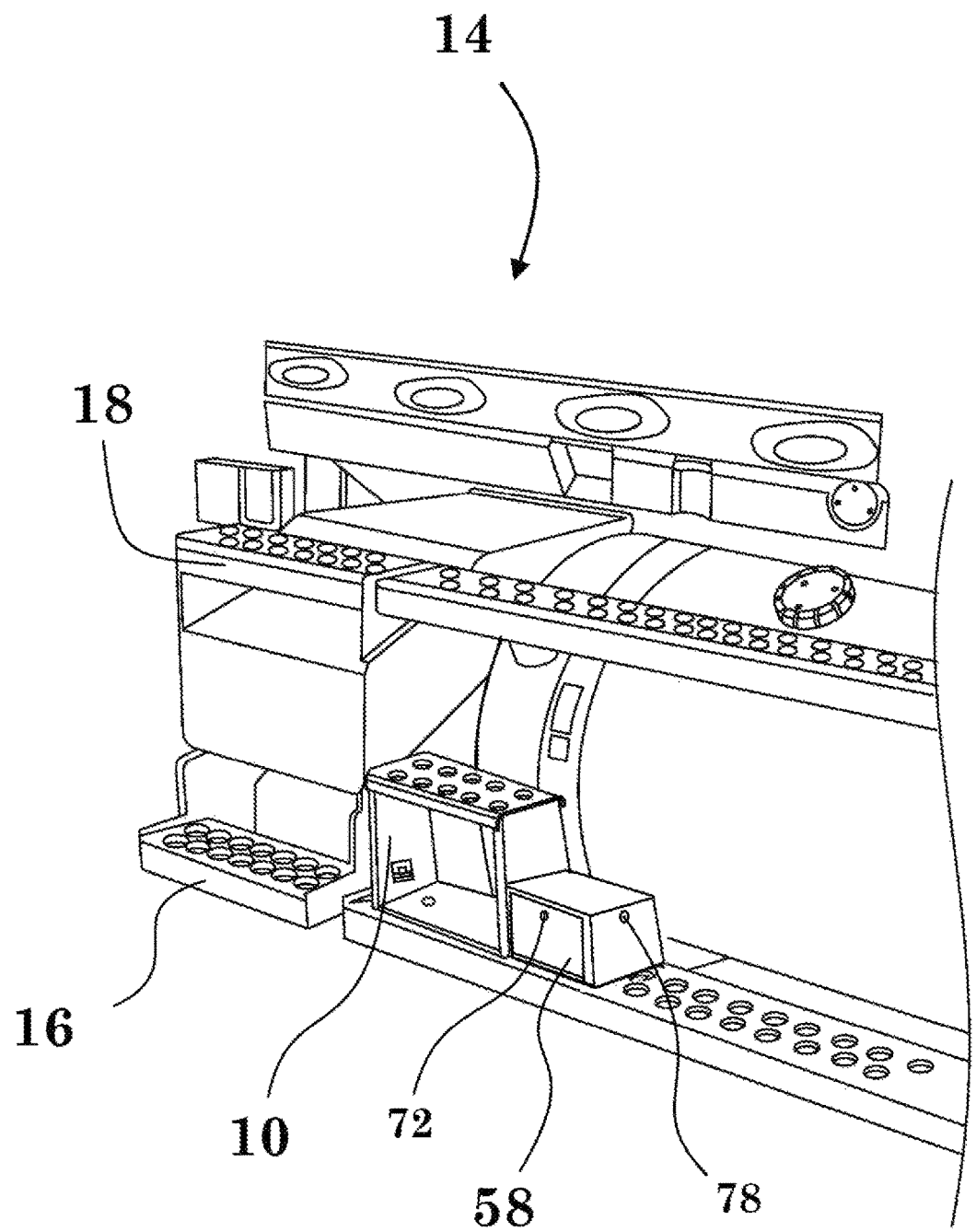
FIG. 2 is a perspective view of one alternative embodiment of a universal easy step defining a secure compartment associated with a step-element of a step system.

One of the goals of the easy step 10 is to make climbing into and out of a large truck 14 (or similar apparatus) easier—particularly useful for drivers with injuries and older drivers which joint issues. Consistent with such goal is to configure the easy step 10 with features that can remove some of the need to climb into large truck 14. Referring now more particularly to FIG. 2, one exemplary embodiment of the easy step 10 comprises a bottom frame element 30 that extends beyond the right frame side element 32 to define the bottom of a secure compartment 58 defined adjacent to the open frame structure. An easy step 10 user can use the secured compartment 58, for example, to store items that are normally stored inside the truck but are often needed when the user is not in the truck.

While the secured compartment 58 is shown having a height of about half that of the frame height 36, the secured compartment 58 can be of any size. Ideally, for the current embodiment, the attachment element interface 42 is disposed inside said secure compartment 58 (perhaps under a false bottom) to hinder unauthorized removal of the easy step 10 apparatus from the large truck 14. Further, the secure compartment 58 preferably comprises sealing features to enhance the compartments weather resistant capabilities and is configured to house an electronic module as disclosed below.

Electronic Features

Figure 10:
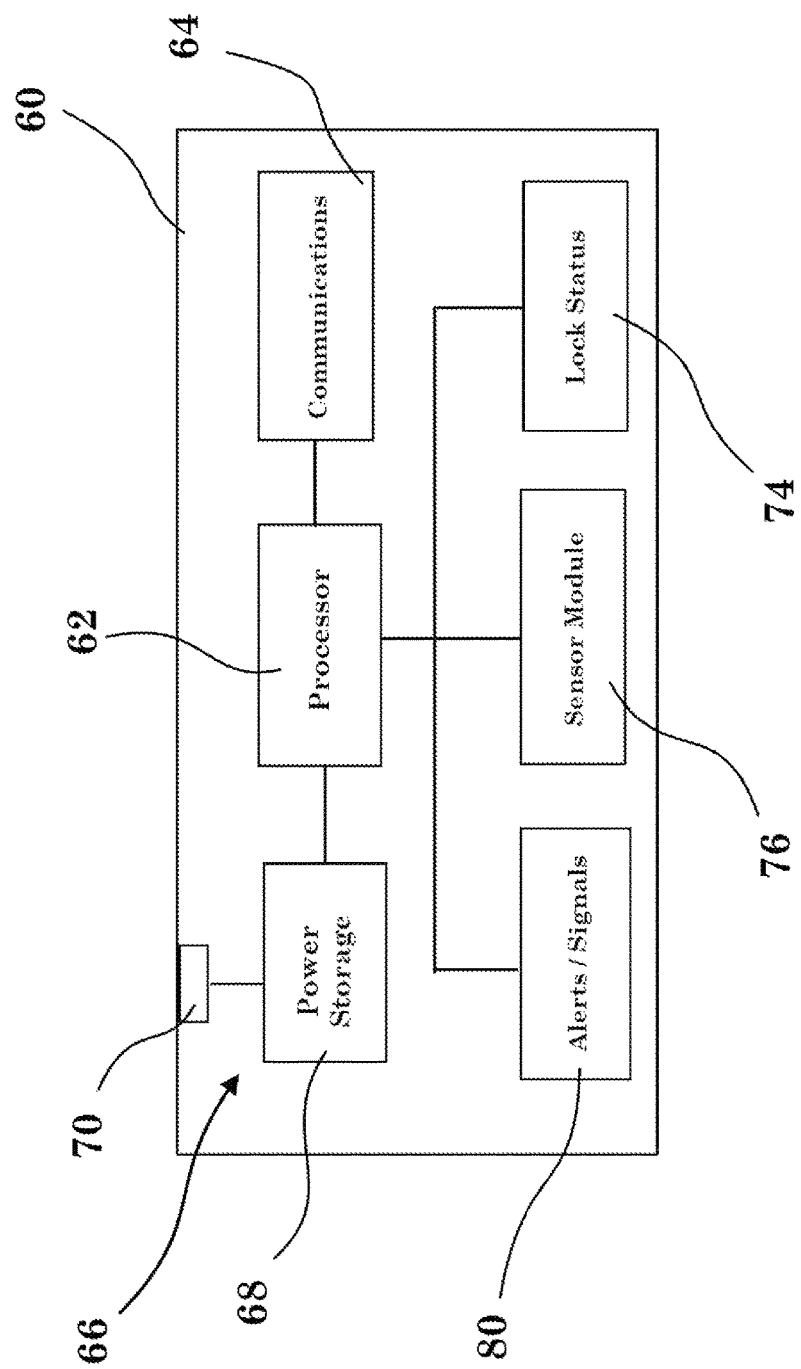
FIG. 10 is a block diagram representation of exemplary electronics.

Referring now to FIG. 10, a block diagram representation of one embodiment of an electronic module 60 is presented. The exemplary electronic module 60 comprises a processor 62 electrically associated with communications circuits 64 and power source 66 which may include a power storage element 68 and/or a power input connection 70 associated with an external power source (e.g. power system of truck 14). The electronic module 60 is configured to define or be associated with a lock status module 74 for controlling and conveying the status of lock 72 (FIG. 2), a sensor module 76 comprising one or more sensor types 78 (such as motion, temperature, camera, etc. FIG. 2) and an alert/signal generator 80 (such as lights and sound and RF signals). For example, for one embodiment the sensor module 76 includes a motion sensor and detects when it is dark and when there is movement and signals processor 62 which generates the necessary signal to activate an alert/signal 80 comprising turning on a light to illuminate the area of the easy step 10 and associated step system.

The electronic hardware comprises standard components known in the art although such hardware is used and controlled by novel methods. The processor 62 may be a microprocessor that supports standard operating systems and application software as well as ASICs (application specific integrated circuit) or ASSPs (application specific standard product). The processor 62 may comprise onboard ROM, RAM, EPROM type memories for storing data and/or program code such as firmware. For one embodiment, electronic module 60 comprises a DSP/ASSP electrically associated with the processor and is preferably configured to perform signal processing tasks such as voice, audio, video, encoding, decoding as well as other data and signal processing functions. Such allows a video sensor 78 to record images while the truck is parked or traveling down a highway (to provide a "dashcam" type function) where such image data is routed to a video display device in the cab of the truck 14. The sensor 76 may include a motion sensor that activates the image sensor when someone enters the truck to record an image of such person and transfer same to a remote device such as a smart phone via the communication circuits 64. Notably, image sensors can be placed on various sides of the secure compartment to provide images along a different axis and the direction of the image sensor is preferably remotely adjustable to "fine tune" the direction of the sensor and the image it captures.

The communication circuitry 64 (such as a transmitter or transceiver), is electrically associated with an antenna and the processor 62. The communications circuitry 64 is configured to transmit a data signal to a remote electronic device (smartphone, WiDi enabled Display, remoter computer, etc). It should be noted that embodiments where the communication circuitry comprises only a transmitter fall within the scope of the invention. For one preferred embodiment, the communication circuitry consumes relatively low power and is configured to communicate with an external device that is expected to be within range of a low power transmitter signal. For example, for one embodiment, the electronic module 60 is associated with security monitoring system or WiFi system. Because such a system is expected to be within close communication range of the electronic module 60, the associated transmitter(s) can be relatively low powered thereby saving energy. That said, embodiments with more powerful transmitters may be used including well known technologies for wireless communications such as GPRS, GSM, GPRS, 3G, and EDGE enabled networks as well as WAP networks. Consequently, for some embodiments, the communication circuitry may define common cell phone communication technology.

Some embodiments may include both a low power transmitter and a high-power transmitter. For low power transceivers, (a low power transmitter relative to the above described "high power" communication circuitry), such transceiver may operate in any number of unlicensed bands although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. By way of example, the low power transmitter may provide communications with devices such as nearby cell phones (via Bluetooth, wifi, etc.) and may further be operable to transmit on one or more FM bands to provide communication through a FM radio.

The Sensor Module 76 can be a sensor array and comprises at least one sensor that is electrically associated with the processor 62. Restated, sensor module 76 may include one sensor or a plurality of sensors and may be configured to monitor any number of predefined environment parameters such as temperature, humidity, motion, sound, smoke and ice. The sensor module 76 may further include wireless sensors in wireless communication with processor 62. Such sensors may be associated with a driver of the truck 14 configured to monitor his movements to detect "sleepy driving" conditions (for example) and issue a warning. Depending on the parameters being monitored/measured, the sensor may be disposed inside electronic module 76 or outside the electronic module 76 and wired or wirelessly connected to processor 62. For example, one sensor may be a temperature sensor that monitors the temperature of easy step interface 46 and notifies a user if ice is possible based on the detected temperature. Such a warning may be sent to the user's cellphone.

The lock status module 74 is configured to report the status of lock 72 and alter its status based on a signal received by processor 62 via communication circuitry 64. Ideally, such feature would allow a user to unlock the secured compartment using an application downloaded and installed on a cellphone. Such cell phone application would preferably be configured to communicate with and monitor any feature of the electronic module 62.

As before, the functions represented by individual module components may be performed by ASSPs (Application Specific Standard Product) although one or more components may be integrated into ASSP chipsets. Manufactures of such devices include Motorola, Chipcon and Texas Instruments. In addition, Complex Programmable Logic Devices (CPLD) may be used to interface the various ASSP components to a system buss allowing one system component to interface with another component. Manufactures of suitable CPLD devices include Lattice's (ispMACH 4000 family) and (Altera's MAX 7000-series CPLD).

The various systems discussed herein are not limited to any particular hardware architecture or configuration. Embodiments of the methods and systems set forth herein may be implemented by one or more general-purpose or customized computing devices adapted in any suitable manner to provide the desired functionality. The device(s) may be adapted to provide additional functionality complementary or unrelated to the present subject matter, as well. For instance, one or more computing devices may be adapted to provide desired functionality by accessing logic or software instructions rendered in a computer-readable form. When software is used, any suitable programming, scripting, or another type of language or combinations of languages may be used to implement the teachings contained herein. However, software need not be used exclusively, or at all. For example, some embodiments of the systems and methods set forth herein may also be implemented by hard-wired logic or other circuitry, including, but not limited to application-specific circuits. Of course, combinations of computer-executed software and hard-wired logic or other circuitry may be suitable, as well.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A universal easy step configured for being mechanically associated with a surface of any one of a plurality of step systems wherein each step system defines at least one first step-element comprising a top step-surface and an opposing bottom step-surface and a plurality of step-surface-voids defining void patterns therethrough, wherein said step system further comprises a second step-element about 20 inches above said first step-element, said universal easy step comprising:
an integral frame defining an open box structure comprising a top plate, a bottom plate, a right side plate and a left side plate wherein a first end of said top plate is mechanically associated with a first end of said bottom plate by said right side plate and wherein a second end of said top plate is mechanically associated with a second end of said bottom plate thereby defining said open box structure having a frame height about 7 inches to about 10 inches between said top plate and said bottom plate and wherein said bottom plate defines an attachment element aperture configured to adjustably receive an attachment element and wherein said right side plate and said left side plate are the same length so that the top plate is parallel to the bottom plate and wherein said attachment element aperture is disposed between the side plates and wherein one of said right side plate or said left side plate further defines a second attachment mechanism defining a hook feature for securing said bottom plate to said top step-surface without hardware modifications;
a first attachment element extending through said attachment element aperture and moveably associated with said attachment element aperture and wherein said first attachment element is further configured for being extended through on of said plurality of surface-voids defined by a first step-element of any one of a plurality of step systems to secure said bottom plate to the top step-surface of said first step-element without hardware modifications.

2. A universal easy step as in claim 1, wherein said first attachment element defines a hook feature configured to allow said bottom plate to be securely associated with said first step-element without access to said bottom step-surface.

3. A universal easy step as in claim 1, further comprising a secured compartment defined adjacent to one of said right side plate or said left side plate and wherein said bottom plate extends beyond at least one of said right side plate or said left side plate thereby defining the bottom of said secure compartment and wherein said attachment element aperture is at least partially disposed inside said secure compartment.

4. A universal easy step as in claim 3, wherein the height of said secure compartment defines a length of about half the length of said frame height thereby defining a second easy step function.

5. A universal easy step as in claim 1, wherein said bottom plate is wider than the top plate creating a plate offset.

6. A universal easy step configured for being mechanically associated with a surface of any one of a plurality of step systems each defining at least one first step-element comprising a top step-surface and opposing bottom step-surface and a plurality of step-surface-voids, said universal easy step comprising:
a frame defining an open box structure, said frame comprising a top plate, bottom plate, a right side plate and a left side plate wherein said top plate is mechanically associated with a said bottom plate by said right side plate and a left side plate thereby defining a frame height therebetween and wherein said bottom plate defines a attachment element interface and wherein said right side plate and said left side plate each define an outer surface and an inner surface;
an easy step surface element that is associated with said to plate or integral to said top plate and wherein said easy step surface element defines an anti-slip outer surface;
an attachment element defining a hook feature associated with said bottom plate and configured to extend through said attachment element interface and one of said plurality of surface-voids defined by the first step-element wherein said attachment element is configured to secure said bottom plate to said first step-element without access to the opposing bottom step-surface and without hardware modifications to said frame and without modification to said step system.

7. A universal easy step as in claim 6, wherein said right side plate and said left side plate are the same length so that the top plate is parallel to the bottom plate and said frame height is between about 7 inches and 11 inches.

8. A universal easy step as in claim 6, further comprising a second attachment mechanism associated with a surface of said left side plate and wherein said attachment element interface is disposed on the right side of said bottom plate.

9. A universal easy step as in claim 8, wherein said second attachment mechanism defines a hook feature and is adjustable to compensate for differences in step-element thicknesses.

10. A universal easy step as in claim 6, wherein said bottom plate extends beyond said right side plate to define the bottom of a secure compartment defined adjacent to said easy step and wherein said attachment element interface is disposed at least partially inside said secure compartment.

11. A universal easy step as in claim 6, further comprising an electronic module comprising a processor electrically associated with communications circuitry and an electronic lock status module associated with an electronic lock configured to lock the access to the secure compartment, wherein the status of said electronic lock can be remotely monitored and altered using a remote computing device.

12. A universal easy step configured for being mechanically associated with a surface of any one of a plurality of step systems, said universal easy step comprising:
an frame defining an open box structure comprising a top plate, a bottom plate, a right side plate and a left side plate wherein a first end of said top plate is mechanically associated with a first end of said bottom plate by said right side plate and wherein a second end of said top plate is mechanically associated with a second end of said bottom plate thereby defining said open box structure having a frame height between said top plate and said bottom plate and wherein said bottom plate defines an first attachment interface;

an anti-slip means that is one of defined by said top plate or associated with said top plate for resisting slippage;

an adjustable attachment means extending through said first attachment interface and configured to extend through a surface-void defined by a step-surface of any one of said plurality of step systems wherein the step-surface defines two opposing sides and wherein said adjustable attachment means is configured for securing said bottom plate to said step-surface without access to both sides of said step-surface and without hardware modifications to said frame.

13. A universal easy step as in claim 12, wherein said right side plate and said left side plate are the same length so that the top plate is parallel to the bottom plate and wherein said frame height is between about 7 inches to about 10 inches and wherein said first attachment interface defines a slot.

14. A universal easy step as in claim 12, wherein said first attachment interface defines a plurality of voids.

15. A universal easy step as in claim 12, wherein said adjustable attachment element means defines a hook feature.

16. A universal easy step as in claim 15, wherein said bottom plate is wider than the top plate creating a plate offset.

\* \* \* \* \*